United States Patent [19]

Anscher

[11] Patent Number: 5,775,859
[45] Date of Patent: Jul. 7, 1998

[54] MAT FASTENER

[75] Inventor: Joseph Anscher, Muttontown, N.Y.

[73] Assignee: National Molding Corp., Farmingdale, N.Y.

[21] Appl. No.: 870,257

[22] Filed: Jun. 6, 1997

[51] Int. Cl.[6] ............................. F16B 13/04; F16B 21/00
[52] U.S. Cl. ......................... 411/38; 411/344; 411/509; 411/913
[58] Field of Search ........................ 411/34, 38, 340, 411/344, 345, 508, 509, 510, 913

[56] References Cited

U.S. PATENT DOCUMENTS

| 4,285,103 | 8/1981 | Inamoto | 411/508 |
|---|---|---|---|
| 4,878,792 | 11/1989 | Frano . | |
| 4,920,618 | 5/1990 | Iguchi | 411/508 X |
| 5,195,857 | 3/1993 | Hiramoto | 411/344 |
| 5,511,283 | 4/1996 | Hirose | 411/38 X |

*Primary Examiner*—Neill R. Wilson
*Attorney, Agent, or Firm*—Collard & Roe, P.C.

[57] ABSTRACT

A device for securing a floor mat to the floor carpet of an automobile, comprising a base plate with an aperture that is positioned on top of a hole in an automobile floor carpet and two leg members attached to the base plate near the aperture and extending downward through the hole. The leg members are foldable at intermediate portions thereof such that the intermediate portions can move apart from each other. A connecting section is attached to the bottom ends of the two leg members to connect them together. A post having at least one prong is mounted on the connecting section and extends upward toward the base plate such that when the leg members are folded, at least a portion of the post extends through the aperture in the base plate and the hole in the carpet. The post also has means for maintaining the leg members in a folded state so that the post extends through the aperture in the base plate. The invention also comprises means for detachably engaging the post with a floor mat.

20 Claims, 3 Drawing Sheets

5,775,859

1

MAT FASTENER

BACKGROUND OF THE INVENTION

1. Field of the Invention

This invention relates to a device for fastening floor mats to the carpeting on the floors of automobiles. In particular, the invention relates to a device that is secured to the carpeting on the floor of the automobile that releasably secures the floor mats to the carpeting.

2. The Prior Art

Automobiles often are equipped with removable floor mats, which keep the underlying carpeting clean. Floor mats have a tendency to move around on the floor of the car, however, and can interfere with the driving of the car, especially if the mats bunch up around the pedals.

Consequently, there have been several attempts to provide means for securing floor mats to the carpeting on the floor of the car, while still allowing their removal for cleaning. While these devices serve their intended purpose, they suffer from many drawbacks.

U.S. Pat. No. 4,878,792 to Frano discloses a car mat fastener comprising a post that is screwed into the carpeting on the floor of the car, and an eyelet mechanism for attaching to the car mat. The eyelet is placed over the post and locked into place by a flange on the top of the post. This invention has the drawback that the post is easily dislodged from the carpet, and must be frequently remounted.

A more secure method of mounting a floor mat to a carpet is shown in U.S. Pat. No. 5,511,283 to Hirose. This patent discloses a floor mat clip comprising a base plate onto which a post is mounted. A foldable frame is mounted beneath the base plate at a location displaced from the post and inserted through a hole in the carpet. An upwardly extending projection is mounted at the bottom of the foldable frame. When the base portion is pushed down, the frame folds and the projection extends toward the base plate. The projection is then engaged by the plate and the frame is kept in a folded, flattened position underneath the carpet. The floor mat is then mounted to the post.

While this device provides a secure mounting mechanism for the floor mat, it suffers from the drawback that the post and frame are laterally displaced from each other, which serves to weaken the attachment of the floor mat to the carpet. In addition, this device is difficult and expensive to manufacture by injection molding, due to its asymmetrical structure.

SUMMARY OF THE INVENTION

It is therefore an object of the present invention to provide a device for securing floor mats to carpeting that does not become easily dislodged from the carpeting.

It is another object of the present invention to provide a device for securing floor mats to carpeting that provides a strong attachment between the floor mat and carpeting.

It is yet another object of the present invention to provide a device for securing floor mats to carpeting that allows for easy detachment of the floor mat.

It is a further object of the present invention to provide a device for securing floor mats to carpeting that is relatively simple and inexpensive to manufacture using injection molding.

These and other objects of the invention are accomplished with a device for securing a floor mat to the floor carpet of an automobile, comprising a base plate with an aperture that is positioned on top of a hole in an automobile floor carpet, and two leg members attached to the base plate near the aperture that extend downward through the hole. The leg members are foldable at their intermediate portions such that the intermediate portions can move apart from each other. A connecting section is attached to the bottom ends of the two leg members to connect them together.

A post having at least one, and preferably two prongs is mounted on the connecting section and extends upward toward the base plate. When the leg members are folded, the post extends through the aperture in the base plate and the hole in the carpet. The device also has means for maintaining the leg members in a folded state so that the post is kept extended through the aperture in the base plate. The device also has means for detachably engaging the post with a floor mat so that the floor mat is secured to the carpeting.

The means for maintaining the leg members in a folded state comprises an annular flange mounted around a lower section of the post, and a groove arranged around the aperture on the base plate. When the leg members are folded, the post is pushed through the aperture until a point where the annular flange engages the groove. Once the flange engages the groove, the leg members cannot return to an unfolded state. A horizontal bore is provided in the post at the level of the annular flange to allow the flange to be compressed as it passes into the aperture. Preferably, a protrusion is also located on the post below the annular flange to serve as a stop to the downward movement of the base plate once the flange engages the groove. This stop prevents the legs from becoming over-stressed from extreme fold angles.

The folding of the leg members is facilitated by hinges that are placed at the folding points, i.e., at the intermediate portions of the leg members and at the connection points between the leg members and the base plate, and between the leg members and the connecting section. These hinges are preferably integrally formed with the leg members.

Preferably, the entire device is integrally formed of one piece of injection-molded nylon, but other materials could also be envisioned.

The means for detachably engaging the post with a floor mat preferably comprises an enlarged head portion mounted on each prong of the post, and an eyelet assembly or grommet mounted through a hole in the floor mat. The post is inserted through the eyelet assembly so that the outwardly extending flange extends above the eyelet assembly to secure the post to the eyelet assembly.

To remove the post from the eyelet assembly, the prongs are pressed together to release the engagement of the head portions with the eyelet assembly. The prongs may also collapse naturally when enough force is applied in lifting the mat.

The eyelet assembly or grommet comprises an upper part and a lower part that are mounted on a hole in the floor mat. The upper part comprises an upper flange and an upper tubular body attached to the upper flange. The lower part comprises a lower flange and a lower tubular body attached to the lower flange. The upper and lower parts can be locked together around the floor mat so that the upper flange part rests on an upper surface of the floor mat and the lower flange part rests against a lower surface of the floor mat and the body parts extend through the hole in the floor mat. The eyelet assembly is preferably made from nylon. The upper and lower parts are locked together by a horizontal slot on one part and a horizontal latch on the other part. The latch engages the slot and locks the two pieces together.

While the above describes a preferred embodiment, there are countless arrangements in forming grommets which have varying means to hold the upper and lower parts together. Another variation might include one part consisting of a flange with numerous snap legs, which snap firmly into a flat rubber washer-type looking part.

In an alternative embodiment of the invention, rather than a bifurcated post which collapses as it enters the grommet, a solid post is used, which engages the grommet via radially-arranged fins located on the inside diameter of the grommet.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
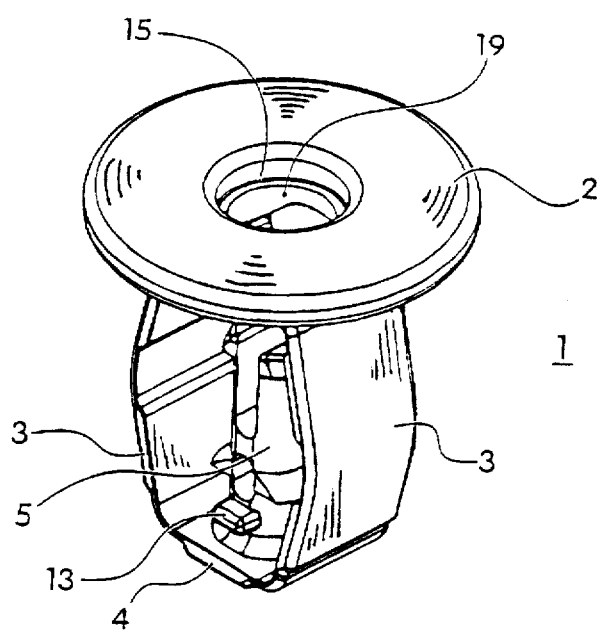
FIG. 1 is a perspective view of the device according to the invention.

Turning now in detail to the drawings, and in particular, FIG. 1, there is shown a device 1 for securing floor mats to carpeting. The device comprises a base plate 2, plate-like leg members 3, connecting section 4, and a post 5. Leg members 3 are connected at their tops to base plate 2 and at their bottoms to connecting section 4. Post 5 extends upward between leg members 3 from connecting section 4. The entire device 1 is integrally formed from one piece of injection-molded nylon.

Figure 2:
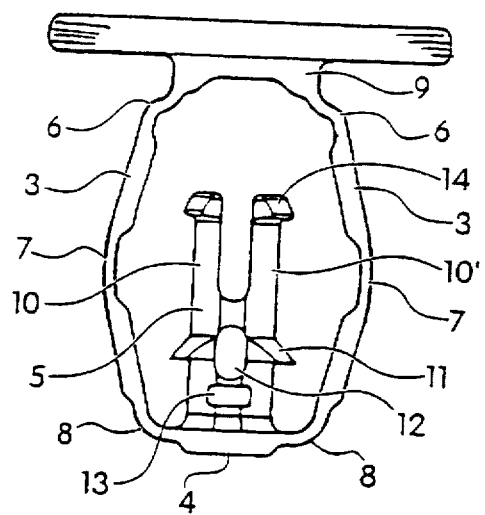
FIG. 2 is a side view of the device according to the invention.

FIG. 2 shows a side cross-sectional view of device 1. As can be seen from FIG. 2, leg members 3 are attached to base plate 2 through a neck section 9, which extends downward from base plate 2. Base plate 2 has an aperture 19 that extends through base plate 2 as shown in FIG. 1. A groove 15 extends around the circumference of aperture 19. Leg members 3 have a convex shape wherein their intermediate sections are farther apart from each other than the top and bottom sections.

This convex shape ensures that legs 3 always fold with the intermediate portions extending away from each other. Hinges 6, 7 and 8 are disposed along leg members 3 to facilitate the folding of leg members 3. Hinges 6, 7 and 8 are preferably integrally formed with leg members 3, as thinner sections of leg members 3.

Post 5 is mounted on connecting section 4 and extends upward between leg members 3. Post 5 is bifurcated at its upper section into two prongs 10 and 10'. Flanged head sections 14 are mounted on top of each prong 10 and 10'. An annular flange 11 surrounds a lower section of post 5. A bore 12 extends through post 5 at the same level as flange 11 to provide a relief to post 5 when flange 11 is compressed inward as legs 3 are folded and post 5 is extended through aperture 19 in base plate 2.

A ledge 13 is mounted on each side of post 5 directly beneath bore 12. Ledge 13 serves as a stop to the downward movement of base plate 2 as legs 3 are folded, to prevent undue pressure from being applied to legs 3, which could damage legs 3 and especially hinges 6, 7 and 8.

Figure 3:
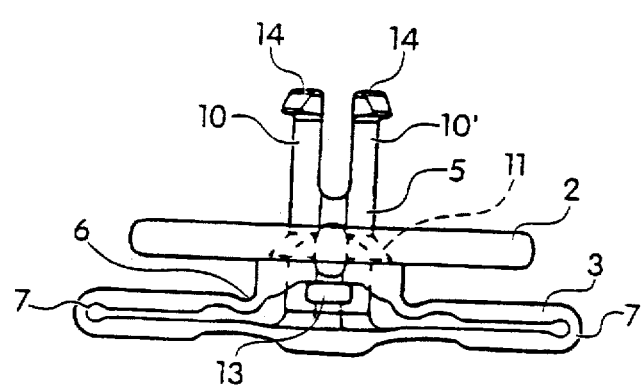
FIG. 3 is a side view of the device according to the invention in the folded position.

Legs 3 are folded by pressing base plate 2 down toward connecting section 4. This causes post 5 to be inserted through aperture 19. Flange 11 proceeds through aperture 19 until it engages groove 15. At this point, ledge 13 on post 5 contacts the underside of base plate 2 and prevents any further downward movement of base plate 2. Flange 11 becomes locked into groove 15 and retains legs 3 in a permanently folded position, as shown in FIG. 3. Bore 12 allows compression of flange 11 as it is inserted through aperture 19 until it comes to rest in groove 15.

Figure 6:
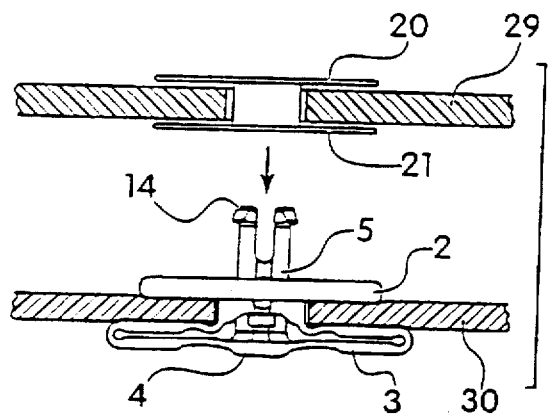
FIG. 6 is a side view of the device and eyelet assembly according to the invention as they are mounted on the floor mat and carpet of an automobile.

As can be seen from FIG. 6, device 1 can be securely and permanently mounted to the carpet 30 on the floor of an automobile by inserting legs 3 through a hole in carpet 30 and pressing base plate 2 down until flange 11 locks into groove 15. In the flattened position, legs 3 cause the device to become significantly wider than the hole in carpet 30 through which device 1 is inserted. This way, device 1 becomes securely and permanently mounted to the carpet 30. Device 1 in the flattened position creates an inconspicuous, yet sturdy design for securing floor mats to carpeting.

Figure 4:
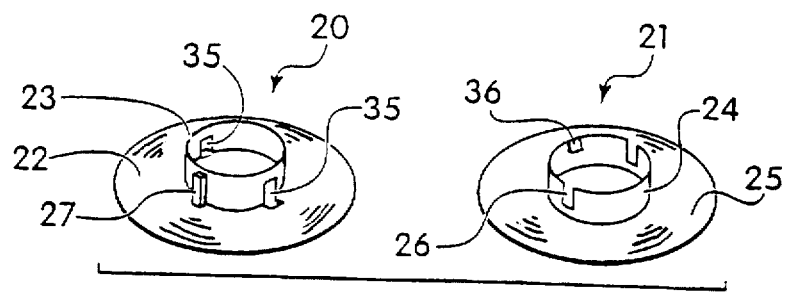
FIG. 4 is a side view of the two parts of the eyelet assembly according to the invention.

FIG. 4 shows two pieces 20 and 21 of an eyelet assembly that can be attached to a floor mat to secure the floor mat to device 1. Piece 20 is comprised of a plate-like flange 22 connected to a hollow tubular body 23. Piece 21 is also comprised of a plate-like flange 25 attached to a hollow tubular body 24. Both flanges 22 and 25 have a center hole corresponding to the interior of tubular bodies 23 and 24. Tubular body 23 is dimensioned so as to fit within tubular body 24. Tubular body 24 has two vertical slots 26 arranged opposite each other. Tubular body 23 has two corresponding vertical protrusions 27 that are dimensioned to fit within slots 26.

Tubular body 23 also has two horizontal slots 35 positioned on opposite sides of body 23 near plate 22. Tubular body 24 has two horizontal latches 36 positioned at the free end of body 24. Latches 36 engage slots 35 and serve to lock pieces 20 and 21 together when tubular body 23 is inserted into tubular body 24.

Figure 5:
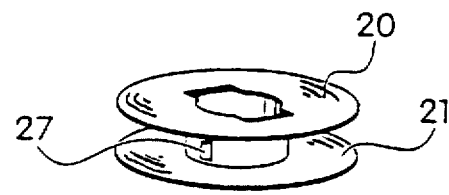
FIG. 5 is a side view of the eyelet assembly according to the invention as assembled.

To use the eyelet assembly, a hole of a sufficient size to accommodate body 24 is made in a floor mat 29. As shown in FIG. 6, piece 20 is placed on top of floor mat 29 and piece 21 is placed underneath floor mat 29 so that body 24 is positioned within the hole in floor mat 29. Body 23 is inserted within body 24 and the two pieces are snapped together, as shown in FIG. 5. Protrusions 26 are slid through slots 27 and serve to guide flanges 36 into slots 35. Protrusions 24 also serve to prevent rotation of piece 20 with respect to piece 21. Alternatively, piece 20 could be located on the underside of floor mat 29 and piece 21 located on top.

Figure 7:
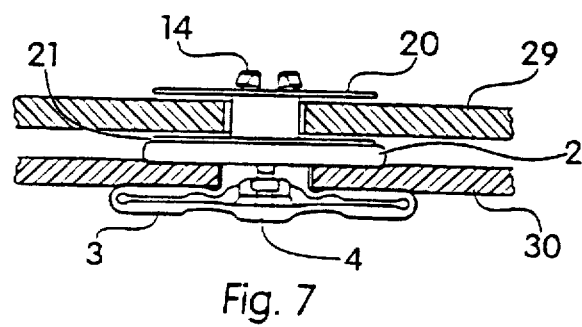
FIG. 7 is a side view of the device and eyelet assembly of FIG. 6 as they are secured together.

FIG. 6 illustrates how pieces 20 and 21 of the eyelet assembly are mounted on device 1 to secure floor mat 29 to carpet 30. Floor mat 29 is lowered down onto carpeting 30 so that pieces 20 and 21 are positioned directly above device 1. Post 5 is inserted through tubular bodies 23 and 24 so that prongs 10 and 10' are inwardly compressed until flanged head portions 14 extend above the surface of piece 20. Flanged head portions 14 then expand outwardly and lock the eyelet assembly to device 1, as shown in FIG. 7. Device 1 can be released from floor mat 29 by pressing head portions 14 inward and releasing their lock on piece 20, whereby floor mat 29 can be lifted off of carpet 30.

Figure 8:
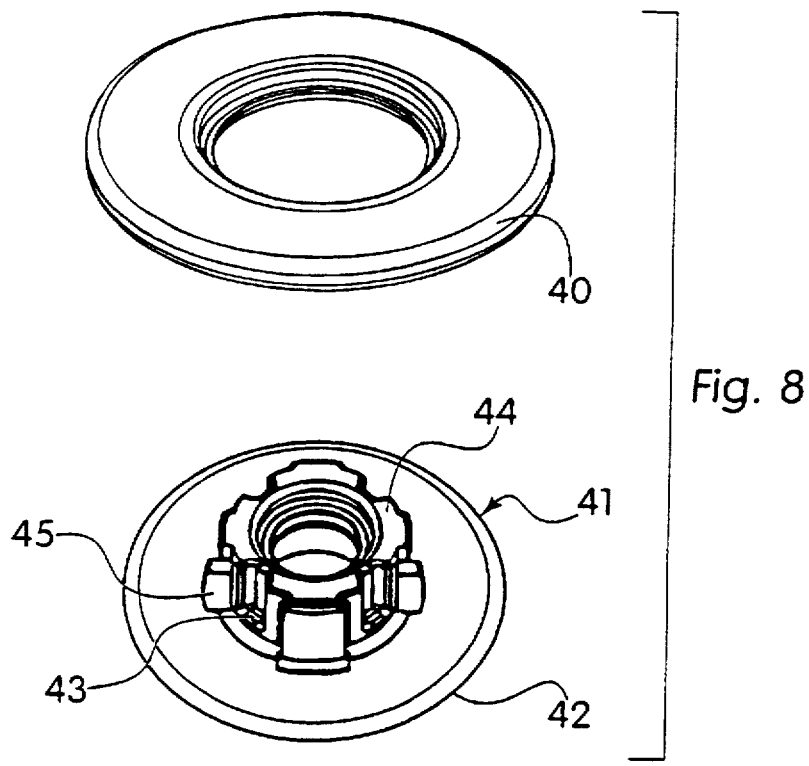
FIG. 8 shows a perspective view of an alternative embodiment of the eyelet assembly.

FIG. 8 shows an alternative embodiment of the eyelet assembly according to the invention, in which the upper part comprises a washer-like plate 40 and a lower part 41, which has a lower flange 42 and a tubular body 43. The tubular body is equipped with a plurality of snap legs 44, which snap onto plate 40, to lock the grommet together.

Figure 9:
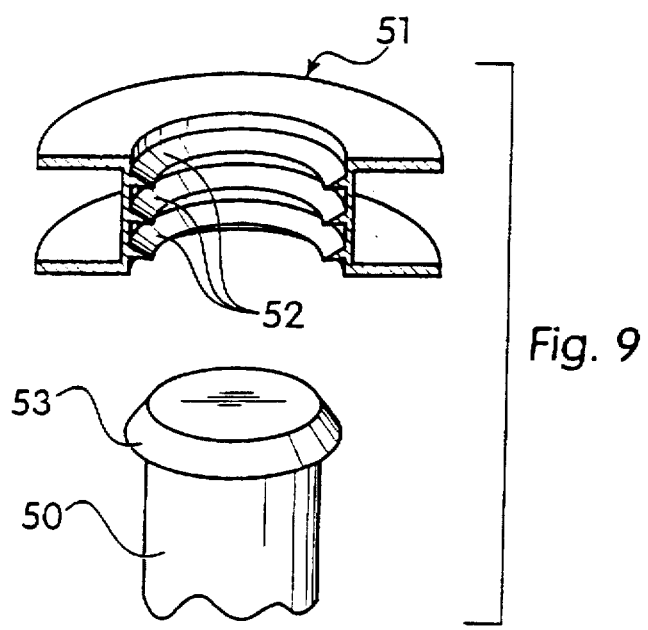
FIG. 9 shows a side cross-sectional view of another embodiment of the post and eyelet assembly according to the invention.

FIG. 9 shows an alternative embodiment of the invention, in which post 50 is solid, and not bifurcated. Post 50 is inserted into eyelet assembly 51 and is held in place by radial fins 52, which are arranged around the inner perimeter of eyelet assembly 51. Fins 52 bend in response to head 53 of post 50, pushing through eyelet assembly 51. After head 54 clears eyelet assembly 51, fins 52 spring back into place and prevent further movement of post 50. Post 50 can be removed from eyelet assembly 51 by pulling eyelet assembly 51 upward with sufficient force so as to cause fins 53 to bend and allow head 53 to pass through eyelet assembly 51.

Accordingly, while only a few embodiments of the present invention have been shown and described, it is obvious that many changes and modifications may be made thereunto without departing from the spirit and scope of the invention.

What is claimed is:

1. A device for securing a floor mat to the floor carpet of an automobile wherein the floor carpet has a hole extending therethrough and is laid on a floor panel, comprising:

a base plate for positioning on top of the floor carpet, said base plate having an aperture positioned above the hole in the floor carpet;

two leg members, each leg member having a top end, an intermediate portion and a bottom end, said top end being attached to the base plate near said aperture and extending downward through the hole in the floor carpet, said leg members being foldable at the intermediate portions such that said intermediate portions can move apart from each other;

a connecting section connecting the bottom ends of said two leg members;

a post mounted on said connecting section, said post having at least one prong and extending upward toward said base plate such that when said leg members are folded by pressing the base plate toward the floor panel, the base plate is brought toward the connecting section and at least a portion of said post extends through the aperture in the base plate and the hole in the carpet;

means for maintaining the leg members in a folded state so that said at least a portion of said post is kept extended through the aperture in the base plate;

an eyelet assembly for mounting around a hole in a floor mat; and means for detachably engaging said post with said eyelet assembly.

2. The device according to claim 1, wherein the means for maintaining the leg members in a folded state comprises:

an annular flange around a lower section of said post; and
    an annular groove located around said aperture, said flange engaging said groove when the leg members are folded so as to maintain the leg members in a folded state.

3. The device according to claim 1, wherein the means for detachably engaging the post with said eyelet assembly comprises a flanged head portion mounted on at least one prong of said post, wherein said post is inserted through said eyelet assembly and said head portion extends above said eyelet assembly to secure the post to the eyelet assembly.

4. The device according to claim 3, wherein the eyelet assembly comprises an upper part and a lower part, said upper part adapted to snap together with the lower part.

5. The device according to claim 4, wherein the upper part of the eyelet assembly comprises an upper tubular body attached to an upper flange, and said lower part comprises a lower tubular body attached to a lower flange, and further comprising means on said upper and lower parts for locking said upper and lower parts together, wherein one of said upper and lower tubular bodies is slid within the other of said upper and lower tubular bodies within a hole in the floor mat, and wherein said upper flange rests against an upper surface of the floor mat and said lower flange rests against a lower surface of the floor mat.

6. The device according to claim 5, wherein the means for locking said upper and lower parts together comprises at least one horizontal slot disposed on one of the upper and lower bodies and at least one horizontal latch disposed on the other of the upper and lower bodies, wherein the horizontal latch engages the horizontal slot when the upper and lower parts are pressed together.

7. The device according to claim 1, wherein the device is made of nylon.

8. The device according to claim 1, further comprising hinges disposed on the intermediate portions of the leg members and between the leg members and the connecting section and between the leg members and the base plate, said hinges facilitating the folding of the leg members.

9. The device according to claim 8, wherein the hinges are integrally formed with the leg members.

10. The device according to claim 2, wherein the post has a horizontal bore running therethrough and intersecting the annular flange, wherein the bore allows the post and flange to compress as the post is inserted through the aperture in the base plate.

11. The device according to claim 2, further comprising a ledge located on the post underneath the annular flange, wherein the ledge prevents the post from insertion into the bore beyond a certain point.

12. The device according to claim 4, wherein the upper part comprises a flat plate having a bore therethrough and the lower part comprises a tubular body connected to a lower flange, wherein the tubular body has a plurality of snap legs arranged around the perimeter of the device for locking onto the plate.

13. The device according to claim 3, wherein the post has two prongs which are collapsed together as the post is inserted through the eyelet assembly.

14. The device according to claim 4, wherein the eyelet assembly further comprises a plurality of radial fins arranged around the inner circumference of the eyelet assembly, said fins allowing said post to be inserted through said eyelet assembly and securing said post to said eyelet assembly.

15. The device according to claim 2, further comprising a ledge located on the post underneath the annular flange, wherein the ledge prevents the post from insertion into the bore beyond a certain point.

16. A device for securing a floor mat to the floor carpet of an automobile wherein the floor carpet has a hole extending therethrough and is laid on a floor panel, comprising:

a base plate for positioning on top of the floor carpet, said base plate having an aperture positioned above the hole in the floor carpet;

two leg members, each leg member having a top end, an intermediate portion and a bottom end, said top end being attached to the base plate near said aperture and extending downward through the hole in the floor carpet, said leg members being foldable at the intermediate portions such that said intermediate portions can move apart from each other;

a connecting section connecting the bottom ends of said two leg members;

a post mounted on said connecting section, said post having at least one prong and extending upward toward said base plate such that when said leg members are folded by pressing the base plate toward the floor panel, the base plate is brought toward the connecting section and at least a portion of said post extends through the aperture in the base plate and the hole in the carpet;

an annular flange located around a lower section of said post;

an annular groove located around said aperture, said flange engaging said groove when the leg members are folded so as to maintain the leg members in a folded state and so that said at least a portion of said post is kept extended through the aperture in the base plate; and means for detachably engaging said post with a floor mat.

17. The device according to claim 16, wherein the device is made of nylon.

18. The device according to claim 16, further comprising hinges disposed on the intermediate portions of the leg members and between the leg members and the connecting section and between the leg members and the base plate, said hinges facilitating the folding of the leg members.

19. The device according to claim 18, wherein the hinges are integrally formed with the leg members.

20. The device according to claim 16, wherein the post has a horizontal bore running therethrough and intersecting the annular flange, wherein the bore allows the post and flange to compress as the post is inserted through the aperture in the base plate.

* * * * *